July 5, 1966  R. KÖSTER  3,259,659
PROCESS FOR THE PRODUCTION OF BORON ALKYLS
CONTAINING METHYL GROUPS
Filed June 19, 1961
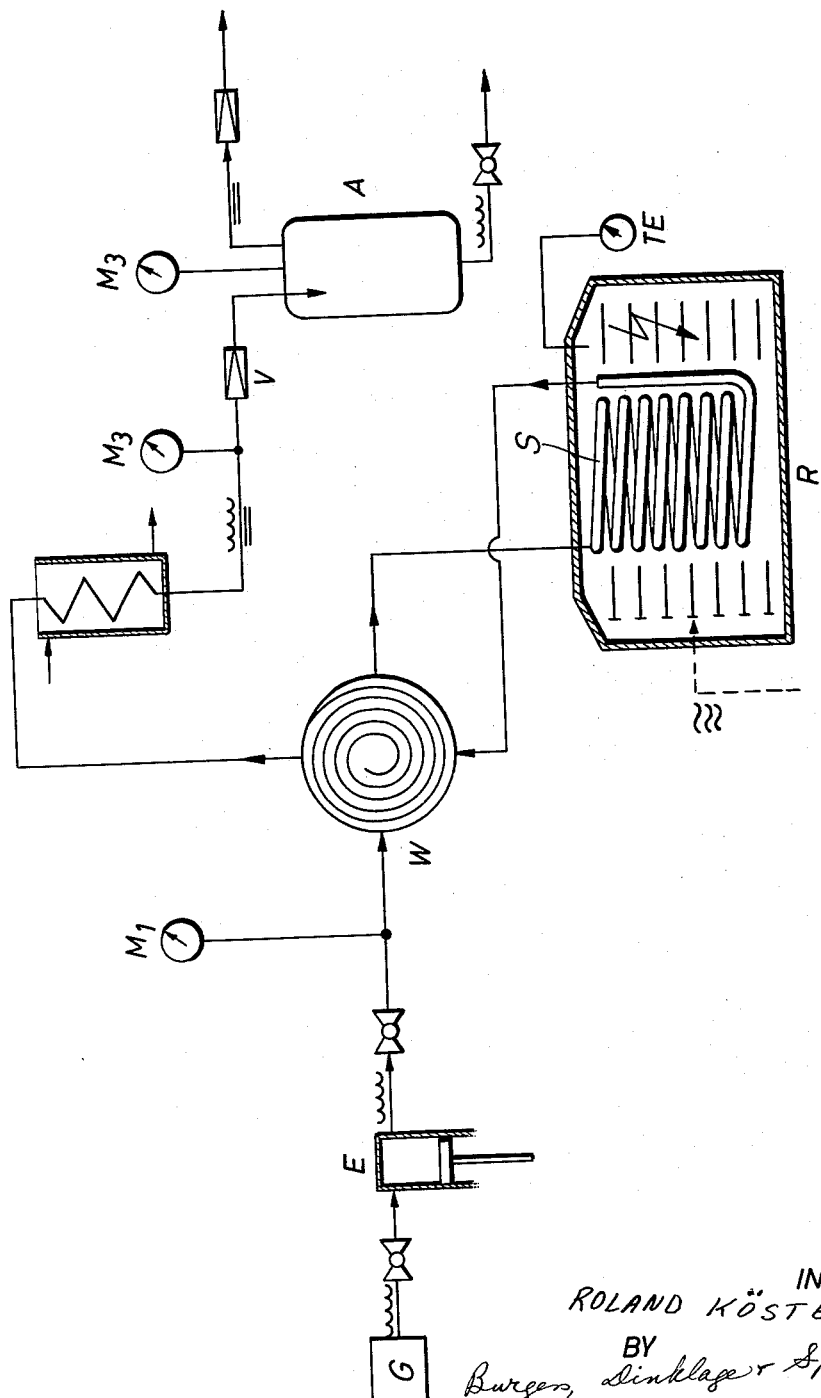
INVENTOR
ROLAND KÖSTER
BY
Burgers, Dinklage & Sprung
ATTORNEYS

United States Patent Office 3,259,659
Patented July 5, 1966

1

3,259,659
PROCESS FOR THE PRODUCTION OF BORON ALKYLS CONTAINING METHYL GROUPS
Roland Köster, Mulheim (Ruhr), Germany, assignor to Studiengesellschaft Kohle m.b.H., a corporation
Filed June 19, 1961, Ser. No. 118,136
Claims priority, application Germany, June 22, 1960, St 16,624
15 Claims. (Cl. 260—606.5)

This invention relates to a process for the production of boron alkyls containing methyl groups and the accompanying drawing illustrates, schematically, an apparatus in which said process may be carried out.

The best hitherto known processes which can be used for the production of boron trialkyls are based on the addition of boron hydride to olefins, or they use aluminum trialkyls as the starting materials and react the same with other boron compounds such as $BF_3$ or boric acid esters or $B_2O_3$ which is activated by transition into so-called boroxol. When starting from aluminum alkyls, the alkyl groups of the boron trialkyls formed are also derived from olefins because the aluminum trialkyls, on a commercial scale, are produced from aluminum, hydrogen and olefin.

This method of effecting the synthesis with the use of olefins as the starting material is not feasible for the production of methyl compounds of boron, the term methyl compounds as used herein being understood to comprise not only boron trimethyl but also all of the mixed boron trialkyls provided that they contain at least one boron bound methyl group as a substituent. Therefore, methyl groups can be combined with the boron only by means of other organometallic compounds, the methods available for the synthesis with other metal-organic compounds being only those which start from methyl chloride. These methods are basically less favorable from the economic point of view than those which use olefins as the starting material because half of the metal valences are consumed to bind the halides. However, in the method mentioned above at the second place and using the aluminum trialkyls as a starting material, the entire aluminum is also bound to halogen or oxygen so that no difference seems to exist in this connection. However, as a matter of fact, the first method, i.e., the addition of olefins to boron hydride, involves the consumption of an amount of metal which is equivalent to the aluminum. It is, however, to be found in the initially necessary production of boron hydride from a boron halide, e.g. according to the equation $$BCl_3 + 3NaH = 3NaCl + 1/2 B_2H_6$$

When comparing the possibility of effecting the synthesis by means of olefins, e.g. for the ethyl compound, with that using methyl chloride to produce the methyl compound, the following two empirical equations result:

(1) $3M + 3/2 H_2 + 3CH_2=CH_2 + BX_3 \rightarrow B(C_2H_5)_3 + 3MX$ (2) $6M + 3CH_3X + BX_3 \rightarrow B(CH_3)_3 + 6MX$ X=e.g., chlorine
M=metal (e.g., Na, 1/3Al, etc.)

from which it is immediately apparent that the total amount of metal required by the route via the methyl halide is higher than that required by the route via the olefin.

It is an object of the invention to provide a process in

2 which the metal-saving route via the olefins is applied to the production of methyl-containing boron alkyls. It has, in fact, been found that higher boron alkyls when heated to temperatures between 150° and 500° C. are decomposed to form boron methyl compounds. This decomposition proceeds, for example, in accordance with the following equation when using boron triisobutyl:

$$(iC_4H_9)_3B \rightarrow iC_4H_9B(CH_3)(C_3H_7) + iC_4H_8$$

The reaction product is methyl-propyl-isobutyl boron. In a similar manner, higher boron alkyls are generally decomposed with the formation of olefins and lower boron alkyls, these lower boron alkyls always containing at least one methyl group.

However, the reaction scheme illustrated above in connection with the decomposition of boron triisobutyl should not be understood literally. Boron alkyls, especially at high temperatures, generally have a tendency to the exchange of alkyl radicals. Therefore, the mixed boron alkyl mentioned above may very easily be converted into a mixture of various boron alkyls, which mixture, according to the empirical formula, has the same composition and contains all mixed boron alkyls which are possible with three alkyl groups (these are further seven) in addition to boron trimethyl, boron tripropyl and boron triisobutyl. Thus, in accordance with the invention, products are formed in which, based on the overall product, boron bound methyl groups are contained in any case. However, each single molecule in the product of the invention must not necessarily contain combined methyl.

In practice, the process of the invention can be carried out in a most simple manner by heating the boron alkyl charged in an autoclave to the temperatures mentioned above. The boron alkyl in vaporous state is advantageously passed through an elongated tube which is heated to the reaction temperature. It is not preferable in any case to bring the decomposition to completion but to operate only with a partial conversion because solid boron-organic compounds which originate from complicated decompositions and, especially in tubular reactors, may finally lead to cloggings are deposited at the walls of the reaction vessels when driving the reaction too far. Since the boiling points of the methyl-containing boron compounds and the olefins split off are generally lower than that of the starting materials, it is very easy to separate the reaction products and to pass the starting materials again to the pyrolysis. Moreover, those compounds which contain hydrogen bound to boron, especially alkylated diboranes and diborane itself as well as the borazanes, i.e., compounds of borine with tertiary amines, have been found to act as catalysts of the reaction. However, the diborane is very rapidly converted into alkylated diboranes under the reaction conditions. Moreover, the added boron hydride compounds disappear in the reaction products since they add themselves to the olefins which are formed as by-products according to the invention. It is by no means necessary, however, to add these catalysts, for, with the high temperatures to be used in accordance with the invention, the boron trialkyls split off olefins to a small extent whereby these catalysts are formed anyhow. However, when materials containing boron hydride compounds are initially added, the process of the invention may be carried out at temperatures which are somewhat lower than those used without the addition of these catalysts.

In addition to boron triisobutyl, the process can also be carried out particularly favorably with other boron trialkyls, especially with propyl and ethyl compounds. However, if radicals containing at least four carbon atoms in a straight chain are bound to the boron, there are also formed cyclic boron compounds with hydrogen being split off from the dialkyl boron hydrides formed by primary olefin cleavage. Therefore, the boron trialkyls with ethyl, propyl and isobutyl will preferably be charged in accordance with the invention.

The olefins isobutylene, propylene and ethylene are formed as by-products depending upon the type of the alkyl radical bound to the boron. These olefins may, of course, be reconverted with boron hydride or via the corresponding aluminum compound into boron trialkyls and again be charged to the process. In this manner, by multiple repetition, the carbon content of the converted boron alkyl can be utilized for the formation of boron bound methyl radicals more extensively than is possible in oncethrough operation.

The same result and simultaneously the production of reaction products which consist entirely of boron trimethyl or in which methyls are preferably bound to the boron can, for example, be obtained with the following process modification: The reaction products obtained, after separation of the olefins, are distilled in a column after the addition of little boron hydride (or after the addition of a small amount of an alkylated boron hydride) or after the addition of a small amount of an aluminum trialkyl. These additions act as catalysts for the alkyl exchange between different boron alkyls, i.e., boron trimethyl is also formed in the methyl-containing boron alkyl mixtures in the presence of these catalysts. This boron trimethyl can be withdrawn as a low boiling product at the top of the column and it is easily understood that finally substantially all of the methyl groups present and bound at the boron can be obtained in this manner in the form of boron trimethyl as the overhead product of the column. The remaining boron trialkyls may be further split in accordance with the invention, and it is achieved in combination with the processing of the olefins described above that the carbon atoms of the boron trialkyl initially charged to the process are largely recovered in the form of boron trimethyl.

The catalytic action already mentioned of materials which contain boron hydride linkages is to be understood such that the cleavage of the C—C linkages taking place in accordance with the invention is brought about by the action of the hydrogen bound at the boron on the alkyl groups bound at the boron, i.e., in the example illustrated in the beginning, the course of the reaction would be about as follows:

(1) $\quad B(C_4H_9)_3 = B(C_4H_9)_2H + C_4H_8$
(2) $\quad B(C_4H_9)_2H = (C_4H_9)B(CH_3)(C_3H_7)$ Transferred to the case of boron triethyl, this means that the reaction proceeds as follows:

$$B(C_2H_5)_3 = (C_2H_5)_2BH + C_2H_4$$
$$(C_2H_5)_2BH = C_2H_5B(CH_3)_2$$

The spontaneous cleavage of ethylene from boron triethyl with formation of a boron hydride linkage is substantially more difficult to achieve than the cleavage of the corresponding olefins from the higher boron trialkyls. For this reason, the formation of boron methyl compounds from boron triethyl can be substantially facilitated by subjecting the boron triethyl, prior to the pyrolysis, to a mild partial hydrogenation by the process of our copending application Serial No. 641,246, filed Feb. 20, 1957, now U.S. Patent No. 3,097,066, i.e., for example, by converting it into penta or even tetraethyl diborane. The use of this trick is also recommendable in the case of the higher boron trialkyls. This process modification is also highly recommendable in the case where boron hydride is available as a starting material for the production of boron trimethyl. In this case, the process can be operated such as it would be described by the following series of reaction equations in the limiting case of the entirely smooth course:

$2(C_3H_7)_3B + BH_3 = 3(C_3H_7)_2BH$
$3(C_3H_7)_2BH = 3C_3H_7(C_2H_5)(CH_3)B$
$3C_3H_7(C_2H_5)(CH_3)B = (C_3H_7)_3B + (C_2H_5)_3B + B(CH_3)_3$
$(C_3H_7)_3B + (C_2H_5)_3B + BH_3 = 2B(C_2H_5)_3 + B(CH_3)_3$
$2B(C_2H_5)_3 + BH_3 = B(C_2H_5)_3 + 2B(CH_3)_3$
$B(C_2H_5)_3 + BH_3 = 2B(CH_3)_3$

In this case, no substantial amounts of olefins are liberated during the reaction, and the simple rearrangement of the hydrogen-containing boron compounds into boron compounds with lower alkyl radicals is the main reaction. Thus, this process modification operates with continuous return of the boron alkyls of which the boron trimethyl is separated in every process step, and it would proceed well in case of a completely ideal course until all of the ethyl groups at the boron are also converted into methyl groups. From this moment, boron alkyls would again have to be added to the process and it will be easily understood that if the process is, for example, continuously operated with ethylene as the olefin and with boron hydride as the source of boron, half of the total boron hydride consumed would have to be converted with ethylene into boron triethyl. These statements are not intended to allege that this process modification is actually capable of being smoothly and quantitatively realized in all steps, for the pyrolysis of boron compounds which contain boron hydride involves certain side reactions which result in an irreversible loss of boron hydrides. It is preferable, therefore, to subject the dialkyl borines to the pyrolysis while in mixture with boron trialkyls and to control this pyrolysis such that approximately just the dialkyl borine portion is consumed. In this manner, the process of the invention can be carried out particularly smoothly.

Of course, the process of the invention needs not necessarily be operated with uniform boron trialkyls, it being also possible to use mixtures of boron trialkyls with alkyls of different molecular size. If, in accordance with the embodiment just described, the olefins formed in the pyrolysis proper are returned into the process, mixtures of this kind will be formed anyhow because several olefins, e.g., isobutylene and propylene or propylene+ethylene are obtained as a rule in the pyrolysis.

The lower boron alkyls produced in accordance with the invention are, for example, used as primers for fuels. It is essential in this connection that the volatility of the boron alkyls be adapted to the requirements. Boron trimethyl itself is that boron trialkyl which has the lowest boiling point. It is easily possible, however, to make from it at will mixed boron trialkyls having almost any adjustable boiling point. For example, the boiling points of the mixed methyl ethyl boron alkyls are as follows:

$B(CH_3)_2C_2H_5$: 12° C.
$B(CH_3)(C_2H_5)_2$: 55° C.

Similar gradations can be obtained by combining methyl and propyl. Therefore, the particularly economic process of the invention for the production of boron trimethyls provides a progress in the production of primers of this type. Mixed methyl alkyl boron compounds of this kind can, of course, also be prepared from the products of the original pyrolysis. However, proceeding via the boron trimethyl itself involves the advantage of permitting a better control of the preparation of the mixed boron alkyls.

*Example 1*

The apparatus consists of the reactor R, a steel tube of 18 meters in length, 5 mm. in inside diameter and a wall thickness of 0.5 mm, The first and the last four meters of this steel tubs S are wound into a coil of about 120 cm. in length and about 8 cm. in diameter, and the remaining central 10 meters of the steel tube are wound into a coil of about 40 cm. in length and about 25 cm. in diameter. The initial and end spirals are slid one above the other and serve as a heat exchanger. The entire coil arrangement is embedded into cast aluminum. Installed in the aluminum block is an electric heater and a thermometer well TE. Moreover, the aluminum block is provided with external heat insulation.

Before the beginning of the reaction, the reactor is heated to the reaction temperature. By means of an injection pump E, the boron-organic liquid is pumped from a stock vessel G through heat exchanger W into the reactor with the exclusion of the air. The residence times in the reaction space proper (about 200 ml.) can be adjusted by varying the pump output and the setting of the pressure-reducing valve V at the outlet of the reactor (back pressure), the pressure of the material fed into and out of the reactor being ascertained by means of manometers $M_1$ and $M_3$, respectively. In case of the mode of operation described herein, the residence times in the heated zone range between 0.1 and 3 seconds. After the pressure-reducing valve, the mixture of substances is passed through a separator A in which the components which are liquid at room temperature are collected. Gaseous products (especially olefins, boron trimethyl) are subsequently collected in a refrigerated receiver or directly passed into a gas holder.

1.95 kgs. (10.75 mols) of boron triisobutyl (32.2 mols $iC_4H_9$) are pumped within about 20 minutes into the reactor which is heated at 350° C. The pressure in the reactor (manometers at the inlet and outlet) is adjusted to about 4 atmospheres at the release valve. The residence time ranges between 2 and 3 seconds. There is obtained a total of 1.93 kgs. of a mixture which, according to analysis by gas chromatography, has the following composition:

Olefins: Gms.
    Propylene _____ 20
    i-Butylene _____ 240
    Little hexenes and little i-butane.
Boron alkyls:
    Boron dimethyl (i-butyl) _____ 30
    Boron methylpropylisobutyl _____ 70
    Boron methyl-di-isobutyl _____ 340
    Boron dipropyl isobutyl _____ 40
    Boron propyl-di-isobutyl _____ 320
    Boron tri-isobutyl _____ 820

Accordingly: Sum of all $CH_3$'s=3.56 mols; sum of all $C_3H_6+C_3H_7$=3.44 mols. (Conversion about 11%.) Residue from distillation: 50 gms.

After complete separation of the olefins (distillation), the boron alkyl mixture is mixed with 100 gms. of tetra-isobutyl diborane. Boron trimethyl escapes when the mixture is heated to about 150° C. in a packed column having about 20 theoretical plates. The gas (boiling point, −20° C.) is condensed in a connected trap cooled to −80° C. There are obtained 60 gms. of boron trimethyl, i.e., practically the total methyl groups at the boron. The residue may be directly subjected to another pyrolysis.

Example 2

280 gms. (1300 ml., 1.5 mols) of boron triisobutyl are heated for 6 hours to 290–310° C. in a 500 ml. autoclave. In doing so, the pressure increases to about 10 atmospheres. After cooling, 9.6 normal liters of gas are blown off. The gas consists of 43.0% isobutane, 53.6% isobutene, 3.2% propane and 0.1% hydrogen (determined by mass-spectroscopic analysis). The simultaneous intense appearance of saturated hydrocarbons is characteristic of autoclave tests in which a limitation of the residence times is difficult to achieve. These hydrocarbons are formed in secondary reactions. Moreover, 260 gms. of a colorless liquid which is spontaneously inflammable in the air are obtained. Distillation of the liquid has the following results:

| Boron alkyl | Mol. wt. | Portion of the $BR_3$'s in Wt. percent | | | | |
| --- | --- | --- | --- | --- | --- | --- |
| | | Fraction I (20 g.) | Fraction II (60 g.) | Fraction III (30 g.) | Fraction IV (145 g.) | Residue (5 g.) |
| $B(CH_3)_2C_3H_7$ | (84) | 7 | | | | |
| $B(CH_3)_2iC_4H_9$ | (98) | 60 | | | | |
| $BCH_3(C_3H_7)(iC_4H_9)$ | (126) | 18 | 13 | 3.6 | trace | |
| $B(CH_3)(iC_4H_9)_2$ | (140) | 10 | 55 | 16 | 1.3 | |
| $B(C_3H_7)_2(iC_4H_9)$ | (154) | 5 | 15 | 4.5 | 2.1 | |
| $B(C_3H_7)(iC_4H_9)_2$ | (168) | | 6 | 22.5 | 15.3 | |
| $B(iC_4H_9)_3$ | (182) | | 11 | 54.5 | 74.9 | little |
| Higher boron alkyls | | | | | | 100 |

Boiling points:
    Fraction I _____ 20–44° C.
    Fraction II _____ 27–64° C. (12 mm. Hg).
    Fraction III _____ 75–82° C. (12 mm. Hg).
    Fraction IV _____ 84–116° C. (9 mm. Hg).

The "propyl" compounds are mixtures of n- and iso-propyl compounds as shown by the gas-chromatographic analysis. Identification (determination of the molecular weight, etc.) of different substances is possible by an appropriate combination of gas chromatography and mass spectrometry.

21 gms. of fraction II in a 100 ml. flask, after the addition of about 0.5 gm. diborane, are heated to boiling up to about 150° C. on a small packed column (about 20 theoretical plates). In doing so, evolution of gas is observed. The escaping gas is condensed in a trap which is cooled to −80° C. There are obtained 2.1 gms. of a colorless liquid which immediately burns in the air and completely evaporates when heated to room temperature. The analysis of the gas shows that 84.7% boron trimethyl in addition to 15.3% isobutane are present. This indicates that a total of 1.8 gms. of methyl boron compounds (about 2 gms.) present in fraction II can be isolated as boron trimethyl.

Example 3

63 gms. of boron tripropyl which are heated for 5 hours at 300–315° C. in a 200 ml. autoclave give the following reaction products:

(a) 4.8 normal liters of gas (8 gms.) having the following composition (mol-percent, determined by mass spectrometry):

| | Percent |
| --- | --- |
| Methane | 11 |
| Ethane | 8 |
| Propylene | 2 |
| Propane | 73 |
| Boron trimethyl | 5 |

(b) 52.4 gms. of a dark brown, spontaneously inflammable liquid, the distillation of which gives the following fractions:

(1) 12.1 g. boiling from 43 to 60° C. and having the following composition (in wt.-percent, determined by gas chromatography)—

| | Percent |
| --- | --- |
| Boron dimethylethyl | 9 |
| Boron dimethyl isopropyl | 7.4 |
| Boron dimethyl-n-propyl | 58.1 |
| Boron methyl-diethyl | 3.9 |
| Boron methylethyl-isopropyl | 4.3 |
| Boron methylethyl-n-propyl | 10.4 |
| Boron triethyl | 0.7 |

(2) 20.2 g. boiling from 34 to 78° C./12 mm. Hg and having the following composition (wt. percent of the main constituents)—

| | Percent |
|---|---|
| Boron methyl dipropyl | 17 |
| Boron ethyl dipropyl | 22 |
| Boron tripropyl | 34 |

(3) 8 g. distil between 30 and 71° C. at $10^{-3}$ mm. Hg (faintly yellow colored liquid); boron content, 4.9%.

(4) 1.5 g. distil at 80° C./$10^{-3}$ mm. Hg (yellow liquid); boron content, 5.8%.

(5) about 9 gms. of a residue in the form of a highly viscous, dark colored mass.

*Example 4*

68 gms. of a mixture of boron triethyl and tetraethyl diborane (217.3 mg. of the mixture evolve 60.4 normal liters $H_2$) are heated for 2.5 hours at 180–215° C. in a 200 ml. autoclave. In doing so, the pressure increases to 150 atmospheres at 200° C. After cooling (34 atm./20° C.), the gases evolved (21 gms.) are blown off. There are obtained 20 normal liters which consists of 90% ethane. In addition, smaller amounts of methane, propane, hydrogen and boron trimethyl are present. The faintly yellow, spontaneously inflammable liquid (43 gms.) is distilled. The following fractions are obtained:

(1) 5 gms. boiling from 25 to 40° C. Compostion:

| | Percent |
|---|---|
| Boron trimethyl | 6 |
| Boron dimethyl-ethyl | 55 |
| Boron methyl-diethyl | 35 |
| Boron triethyl | 4 |

(2) 8 gms. boiling from 40 to 60° C. Composition:

| | Percent |
|---|---|
| Boron trimethyl | 10 |
| Boron dimethyl-ethyl | 57 |
| Boron methyl-diethyl | 21 |
| Boron triethyl | 12 |

(3) 20 gms. boiling from 60 to 120° C. Composition:

| | Percent |
|---|---|
| Boron dimethyl-ethyl | 3 |
| Boron methyl-diethyl | 15 |
| Boron triethyl | 82 |

(4) 10 gms. of non-distillable, higher molecular weight boron compounds which are partially solid.

*Example 5*

A mixture of 105 gms. of boron tri-isobutyl and 5 gms. of tetraisobutyl diborane is heated for 4 hours at 280° C. in a 200 ml. autoclave. The pressure reaches about 10 atmospheres. After cooling, the colorless liquid mixture is removed from the autoclave. Gaseous products are not formed. The analysis of the liquid has the following result:

11.7% by weight of boron methyl-di-isobutyl
10.2% by weight of boron propyl-di-isobutyl
64.3% by weight of boron-tri-isobutyl
1.9% by weight of an impurity from the boron tri-isobutyl
11.1% by weight of a higher boiling boron compound.

What I claim is:

1. A method of producing methylated boranes which are fluid at room temperature which comprises heating a member selected from the group consisting of alkyl diboranes, trialkyl boranes, and mixtures thereof in which alkyl stands for $C_2$–$C_4$ to a temperature of above 150° C. and separating the methylated borane compounds thereby formed as a distillate from the reaction mixture.

2. Method according to claim 1 which comprises heating said alkylated borane group member to a temperature of from about 200–500° C.

3. Method according to claim 1 which comprises heating said alkylated borane group member to a temperature from about 200–500° C. in the presence of a boron hydride.

4. Method according to claim 3 wherein said alkylated borane compound is a boron trialkyl and said heating is effected in the presence of a member selected from the group consisting of alkylated diborane and borane trialkyl amines, the alkyl groups of which contain from 2 to 4 carbon atoms.

5. Method according to claim 4 in which said last mentioned group member is present in an amount of from 1 to 50 mol percent.

6. Method according to claim 1 which comprises carrying out said distillation of the reaction mixture in the presence of a member selected from the group consisting of boron hydride and aluminum trialkyl at catalyst for expediting the rearrangement of the boron compound in the reaction mixture to form boron compounds with lower alkyl radicals and continuously withdrawing trimethyl boron as a head product from said distillation.

7. Method according to claim 1 in which at least a portion of the alkylated borane compound is present in the form of a hydride.

8. A method of producing methylated boranes which are fluid at room temperature which comprises substantially continuously passing through a reaction zone a member selected from the group consisting of alkyl diboranes, trialkyl boranes, and mixtures thereof in which alkyl stands for $C_2$–$C_4$, maintaining said reaction zone at a temperature above 150° C., maintaining a residence time for said borane group member in said reaction zone sufficient to convert at least a portion thereof to methylated boranes fluid at room temperature and separating the methylated borane compounds thereby formed as a distillate from the reaction mixture.

9. A method of producing methylated boranes which are fluid at room temperature which comprises substantially continuously passing through a reaction zone a member selected from the group consisting of alkyl diboranes, trialkyl boranes, and mixtures thereof in which alkyl stands for $C_2$–$C_4$, maintaining said reaction zone at a temperature above 150° C., maintaining a residence time for said group member in said reaction zone sufficient to convert only a portion thereof to a methylated borane, separating the methylated borane compound thereby formed as a distillate from the reaction mixture and returning to said reaction zone the unmethylated boron compounds present in said reaction mixture after separation therefrom of said methylated borane compounds.

10. Method according to claim 9 which comprises subjecting said alkylated borane group member to a temperature of from about 200–500° C.

11. Method according to claim 9 which comprises subjecting said alkylated borane group member to a temperature of from about 200–500° C. in the presence of a boron hydride.

12. Method according to claim 9 wherein said alkylated borane compound is a boron trialkyl and said boron alkyl is subjected to said temperature in the presence of a member selected from the group consisting of alkylated diboranes and borane trialkyl amines, the alkyl groups of which contain from 2–4 carbon atoms.

13. Method according to claim 12 in which said last-mentioned group member is present in an amount of from 1 to 50 mol percent.

14. Method according to claim 9 which comprises carrying out said distillation of the reaction mixture in the presence of a member selected from the group consisting of boron hydride and aluminum trialkyl as catalyst for expediting the rearrangement of the boron compounds present in the reaction mixture to form compounds with lower alkyl radicals and continuously withdrawing trimethyl boron as a head product from said distillation.

15. Method according to claim 9 in which at least a portion of the alkylated borane compound is present in the form of a hydride.

References Cited by the Examiner

UNITED STATES PATENTS

| | | | |
|---|---|---|---|
| 2,938,826 | 5/1960 | Goller et al. | 260—606.5 |
| 3,011,001 | 11/1961 | Mangold et al. | 260—606.5 |
| 3,180,881 | 4/1965 | Zosel et al. | 260—606.5 X |

OTHER REFERENCES

Wintermitz, Amer. Chem. Soc., Abstracts of Papers 135th meeting (1959), p. 19M.

TOBIAS E. LEVOW, *Primary Examiner*.

LEON D. ROSDOL, SAMUEL H. BLECH, *Examiners*.

L. A. SEBASTIAN, F. R. OWENS, *Assistant Examiners*.

UNITED STATES PATENT OFFICE
CERTIFICATE OF CORRECTION

Patent No. 3,259,659                                    July 5, 1966

Roland Köster

It is hereby certified that error appears in the above numbered patent requiring correction and that the said Letters Patent should read as corrected below.

Column 4, line 73, after "0.5 mm" strike out the comma and insert instead a period; line 74, for "tubs" read -- tube --; column 5, line 64, for "(1300 ml., 1.5 mols)" read -- (300 ml., 1.5 mols) --; column 6, in the table, fifth column, line 7 thereof, for "54.5" read -- 54.4 --; column 7, line 22, for "consists" read -- consist --; column 8, line 17, for "at catalyst" read -- as catalyst --; line 73, after "form" insert -- boron --.

Signed and sealed this 1st day of August 1967.

(SEAL)
Attest:

EDWARD M. FLETCHER, JR.                          EDWARD J. BRENNER
Attesting Officer                                  Commissioner of Patents